US008280165B2

(12) United States Patent
Meng et al.

(10) Patent No.: US 8,280,165 B2
(45) Date of Patent: Oct. 2, 2012

(54) SYSTEM AND METHOD FOR SEGMENTING FOREGROUND AND BACKGROUND IN A VIDEO

(75) Inventors: Long Meng, Haidian (CN); Weiguo Wu, Haidian (CN); Yuwei Li, Chao Yang (CN)

(73) Assignee: Sony Corporation, Tokyo (JP)

( * ) Notice: Subject to any disclaimer, the term of this patent is extended or adjusted under 35 U.S.C. 154(b) by 572 days.

(21) Appl. No.: 12/563,705

(22) Filed: Sep. 21, 2009

(65) Prior Publication Data

US 2010/0098331 A1    Apr. 22, 2010

(30) Foreign Application Priority Data

Sep. 26, 2008    (CN) .......................... 2008 1 0169210

(51) Int. Cl.
   *G06K 9/34*    (2006.01)
(52) U.S. Cl. ........................................ 382/173; 382/174
(58) Field of Classification Search .................. 382/173, 382/174
   See application file for complete search history.

(56) References Cited

U.S. PATENT DOCUMENTS

| | | | | |
|---|---|---|---|---|
| 6,954,498 | B1 * | 10/2005 | Lipton | 375/240.08 |
| 2006/0170769 | A1 * | 8/2006 | Zhou | 348/143 |
| 2007/0098255 | A1 | 5/2007 | Yokono | |
| 2007/0206865 | A1 * | 9/2007 | Boregowda et al. | 382/225 |
| 2007/0286520 | A1 * | 12/2007 | Zhang et al. | 382/264 |
| 2008/0285859 | A1 * | 11/2008 | Lei et al. | 382/224 |

FOREIGN PATENT DOCUMENTS

JP    2004-30629    1/2004

OTHER PUBLICATIONS

Lefloch et al., "Real-time people counting system using a single video camera," Real-Time Image Processing, SPIE, 2008, pp. 681109-681109-12.*
Shan et al., "Improved algorithms for motion detection and tracking," Optical Engineering, vol. 45m n 6, Jun. 2006.*

* cited by examiner

*Primary Examiner* — Anand Bhatnagar
*Assistant Examiner* — Soo Park
(74) *Attorney, Agent, or Firm* — Oblon, Spivak, McClelland, Maier & Neustadt, L.L.P.

(57) ABSTRACT

The present invention discloses a system and method for segmenting foreground and background in a video, wherein the system comprises: a video shooting module for shooting the video; a data reading module for reading each frame of the video; a primary segmentation module for establishing a plurality of Gaussian models in a first color space for each pixel of each frame, and performing a matching processing between each pixel of the current frame and the plurality of Gaussian models corresponding to the pixel, and primarily segmenting the pixels as foreground and background according to the result of the matching processing; and a segmentation rejudging module for performing a rejudging processing to the primarily segmented foreground and background in a second color space, so as to obtain the finally determined foreground and background. The present invention improves the effect of foreground segmentation by using the combination of the color spaces and introducing the relationship between pixels.

20 Claims, 6 Drawing Sheets

SYSTEM AND METHOD FOR SEGMENTING FOREGROUND AND BACKGROUND IN A VIDEO

TECHNICAL FIELD

The present invention relates to a segment of moving object in a video shot by a fixed video camera (camera) in the fields of monitoring, artificial intelligence, computer vision and so on, in particular, to a system and method for segmenting foreground and background in a video.

BACKGROUND OF THE INVENTION

An effective thought for solving the problem of segmenting motion foreground in a video is to compare each frame of images of the current video with a reference image representing background and calculate the difference there-between. In the initial solution, the reference image representing background generally is represented by a statistical model.

In a method, an independent single Gaussian model is established for each pixel based on the latest N frames of images, namely representing the background reference image by a statistical model in normal distribution.

In another method, a mixture Gaussian model is adopted, in which color distribution of one pixel is represented by a plurality of statistical models. This method allows the reference background model to have certain adaptability and learning capability. Regarding the motion and variation generated in the background image, the background model may learn the variation of background during update by updating model parameter and updating model weight, so as to reduce segment error. However, the background portion that is covered by shadow is not judged and processed in this method, so that it is easily to appear a large region that is segmented as foreground in a shadow projected by a motion foreground. In addition, since limitation of RGB color space and inconsideration of association between the adjacent pixels in frame images in the video in this method, an error usually appearing in the segmenting result is that some parts of the motion foreground object is segmented as background because the color value of said parts in RGB space is similar to the background model, so that there is cavity inside the background object.

In addition, a final segmenting result can be obtained by using the combination of segment of color information and segment of gradient information, and the segmenting result is improved during the variation of illumination condition by using the characteristic that the gradient is not sensitive to the variation of illumination, and then segment is carried out in three levels respectively, namely pixel-level, region-level and frame-level. This method uses a mixture Gaussian model in RGB space at pixel-level, and performs segment according to color information and gradient information respectively; a false foreground portion caused by the variation of illumination is excluded from the results of color segment and gradient segment when performing segment at region-level; the segment result based on color information is neglected and only the segment result based on gradient remains if the proportion of foreground region in the picture takes more than 50% during processing at frame-level finally. Compared with the improved method based on the mixture Gaussian model, said method can obtain a better result in the instances that the illumination varies slowly and the light varies instantaneously, so as to increase the adaptability of the foreground segment to the outer illumination variation. However, said method fails to process the cavity of the regions with similar color during segment of Gaussian model and to consider the association between the adjacent pixels.

In U.S. Pat. No. 0,194,131, a filter template is used to remove discrete segment noises. However, said method only uses a de-noising operation similar to morphology stiffly and fills up the cavity inside the foreground object very limitedly.

Furthermore, in U.S. Pat. No. 0,194,131, a segment is carried out by comparing the image after diverted into HSV space with background reference image. A modeling of a mixture Gaussian model may also be performed after diverting image from RGB color space to HSV space, and operations to image are performed in HSV space directly.

However, it is found from experimentation that H value and S value have greater fluctuation when color value of RGB space is converted into color value of HSV space, and H value becomes ineffective with respect to pixels with three equal components R, G, and B, so that components H and S are not stable when establishing a statistical model in HSV space, thereby relative more errors are generated.

Therefore, a system and method capable of solving the cavity inside the foreground object and improving the correctness of segment to background are required.

SUMMARY OF THE INVENTION

The present invention aims to solve the problems existed in the prior art.

The basic thought of the present invention is to carry out segment by combining the judgments of two color spaces, because in the video, pixels have different characteristics in different color spaces. Furthermore, a relationship between the adjacent pixels is introduced during the second judgment. The method of the present invention can improve cavity inside the foreground object and noising points effectively by means of combination of two color spaces and local optimization based on pixel relativity, so as to obtain a better segment result.

According to one aspect of the present invention, a system for segmenting foreground and background in the video is provided, said system comprises: a video shooting module, for shooting the video; a data reading module, for reading each frame of the video; a primary segmentation module, for receiving each frame of the video from the data reading module, establishing a plurality of Gaussian models in a first color space for each pixel of each frame, and performing a matching processing between each pixel of a current frame and the plurality of Gaussian models corresponding to the pixel, and primarily segmenting the pixels as foreground and background according to the result of the matching processing, wherein a part of the plurality of Gaussian models being selected as background model and the rest as foreground model; and a segmentation rejudging module, for performing a rejudging processing in a second color space to the foreground and background that are processed by the primary segmentation module, so as to obtain a finally determined foreground and background.

The primary segmentation module further comprises: a matching module, for performing a matching processing between each pixel of the current frame and the plurality of Gaussian models corresponding to the pixel in a descending order of weight, and if a difference between a value of a current pixel in the first color space and a value of one Gaussian model in the first color space is smaller than a first threshold value, determining that the current pixel matches one Gaussian model, wherein pixels matching the background model being determined as background, and pixels matching the foreground model or having no matched models being determined as foreground; and a parameter updating module, for updating parameters of a Gaussian model by using the color value of the current pixel, when it is determined in the matching module that the current pixel matches said Gaussian model, and for initializing newly a model having the smallest weight in the plurality of Gaussian models by using the color value of the current pixel, when it is determined in the matching module that no Gaussian model matches the current pixel.

Preferably, the primary segmentation module further comprises: a shadow removing module, for performing a shadow removing processing to pixels that are segmented primarily as foreground, so as to correct the result of primary segmentation.

In the shadow removing module, when the absolute value of the hue difference between one pixel and a corresponding background model thereof is smaller than a second threshold value, the saturation difference is smaller than a third threshold value and the luminance difference is bigger than a fourth threshold value and smaller than a fifth threshold value, the pixel is determined as shadow, viz. the pixel is determined as background.

In addition, the segmentation rejudging module comprises: a calculation module, for calculating a difference between a value of a specific pixels in the second color space and a value of a background model thereof in the second color space, the difference being represented by a weighted value of difference between the specific pixels as well as pixels in m neighborhoods around it and the corresponding background models thereof in the second color space, wherein m is an integer equal to or more than two; and a determination module, for determining the specific pixels as foreground when the weighted value is bigger than a sixth threshold value, otherwise as background.

Preferably, the specific pixels are pixels that are segmented as background primarily by the primary segmentation module and in neighborhoods around which there are pixels segmented primarily as foreground.

The value of the background model to which the specific pixels correspond in the second color space is calculated by an average value of one or several background models of the specific pixels in the first color space. In this instance, the primary segmentation module further comprises: a difference calculation module, in the case that it has been found a matched background model for a current pixel in the plurality of Gaussian models, for calculating a value of the matched background model in the second space according to an average value of the matched background model, and calculating a value of the current pixel in the second color space according to a value of the current pixel in the first color space, so as to obtain a difference between the value of the current pixel and the background model thereof in the second color space; and in the case that there is no matched background model for the current pixel in the plurality of Gaussian models, for calculating a value of the background model in the second space according to an average value of a background model having the highest weight, and calculating the value of the current pixel in the second color space according to the value of the current pixel in the first color space, so as to obtain a difference between the value of the current pixel and the background model thereof in the second color space, then providing the calculated difference to the segmentation rejudging module.

Alternatively, the value of the background models to which the specific pixels correspond in the second color space are directly obtained by establishing Gaussian model for the specific pixels in the second color space.

In addition, the system further comprises: a denoising module, provided between the primary segmentation module and the segmentation rejudging module and for scanning pixels that are processed by the primary segmentation module one by one and counting a number of pixels that are segmented primarily as foreground in n neighborhoods around each pixel, if the pixels being segmented primarily as foreground and the number being smaller than a seventh threshold value, the pixels being determined as background newly, while if the pixels being segmented primarily as background and the number being bigger than a eighth threshold value, the pixels being determined as foreground newly, wherein the eighth threshold value is bigger than the seventh threshold value, and n is an integer equal to or more than two.

According to another aspect of the present invention, a method for segmenting foreground and background in the video is provided, the method comprises the following steps: a video shooting step of shooting the video; a data reading step of reading each frame of the video; a primary segmentation step of receiving each frame of the video read in the data reading step, establishing a plurality of Gaussian models in a first color space for each pixel of each frame, and performing a matching processing between each pixel of a current frame and the plurality of Gaussian models corresponding to the pixel, and primarily segmenting the pixels as foreground and background according to the result of the matching processing, wherein a part of the plurality of Gaussian models being selected as background model and the rest as foreground model; and a segmentation rejudging step of performing a rejudging processing in a second color space to the foreground and background that are processed in the primary segmentation step, so as to obtain a finally determined foreground and background.

In addition, the primary segmentation step further comprises: a matching step of perfomring a matching processing between each pixel of the current frame and the plurality of Gaussian models corresponding to the pixel in a descending order of weight, and if a difference between a value of a current pixel in the first color space and a value of one Gaussian model in the first color space is smaller than a first threshold value, determining that the current pixel matches one Gaussian model, wherein pixels matching the background model being determined as background, and pixels matching the foreground model or having no matched models being determined as foreground; and a parameter updating step of updating parameters of a Gaussian model by using the color value of the current pixel, when it is determined in the matching step that the current pixel matches said Gaussian model, and for initializing newly a model having the smallest weight in the plurality of Gaussian models by using the color value of the current pixel, when it is determined in the matching step that no Gaussian model matches the current pixel.

Preferably, the primary segmentation step further comprises: a shadow removing step of performing a shadow removing processing to pixels that are segmented primarily as foreground, so as to correct the result of primary segmentation.

In the shadow removing step, when the absolute value of the hue difference between one pixel and a corresponding background model thereof is smaller than a second threshold value, the saturation difference is smaller than a third threshold value and the luminance difference is bigger than a fourth threshold value and smaller than a fifth threshold value, the pixel is determined as shadow, viz. the pixel is determined as background.

Furthermore, the segmentation rejudging step comprises: a calculation step of calculating a difference between a value of a specific pixels in the second color space and a value of a background model thereof in the second color space, the difference being represented by a weighted value of difference between the specific pixels as well as pixels in m neighborhoods around it and the corresponding background models thereof in the second color space, wherein m is an integer equal to or more than two; and a determination step of determining the specific pixel as foreground when the weighted value is bigger than a sixth threshold value, otherwise as background.

Preferably, the specific pixels are pixels that are segmented as background primarily by the primary segmentation step and in neighborhoods around which there are pixels segmented primarily as foreground.

The value of the background model to which the specific pixels correspond in the second color space is calculated by an average value of one or several background models of the specific pixel in the first color space. In this instance, the primary segmentation step further comprises: a difference calculation step, in the case that it has been found a mateched background model for a current pixel in the plurality of Gaussian models, for calculating a value the matched background model in the second space by the difference calculation module according to an average value of the matched background model, and calculating a value of the current pixel in the second color space according to a value of the current pixel in the first color space, so as to obtain a difference between the value of the current pixel and the background model thereof in the second color space; and in the case that there is no matched background model for the current pixel in the plurality of Gaussian models, for calculating a value of the background model in the second space according to an average value of a background model having the highest weight, and calculating the value of the current pixel in the second color space according to the value of the current pixel in the first color space, so as to obtain a difference between the value of the current pixel and the background model thereof in the second color space, then providing the calculated difference to the segmentation rejudging step.

Alternatively, the value of the background models to which the specific pixels correspond in the second color space is directly obtained by establishing Gaussian model for the specific pixels in the second color space.

In addition, the method further comprises: a denoising step, performed between the primary segmentation step and the segmentation rejudging step, for scanning pixels that are processed by the primary segmentation step one by one and counting a number of pixels that are segmented primarily as foreground in n neighborhoods around each pixel, if the pixels are segmented primarily as foreground and the number is smaller than a seventh threshold value, the pixels are determined as background newly, while if the pixels are segmented primarily as background and the number is bigger than a eighth threshold value, the pixels are determined as foreground newly, wherein the eighth threshold value is bigger than the seventh threshold value, and n is an integer equal to or more than two.

According to the present invention, after a segment has been performed in the first color space by using Gaussian models, a rejudgment is carried out according to the segment result as well as by using the difference between pixels in the second color space and background, two color spaces are combined for use and the relationship among pixels is introduced, and a shadow removing module is used additionaly, so that a segment of moving object in a video shot by a fixed video camera is improved effectively.

Other features and advantages of the present invention will be illustrated in the description subsequently, and become obvious from the description partially, or be understood by carrying out the present invention. The object and other advantages of the present invention can be realized and obtained through the drafted description, claims as well as the structures shown in the figures especially.

BRIEF DESCRIPTION OF THE DRAWINGS

Figures provide further understanding to the present invention and form one part of the description, the figures together with the embodiments are used for illustrating the present invention instead of limitation to the present invention. Figures show.

DESCRIPTION OF PREFERRED EMBODIMENTS

Hereinafter, preferable embodiments of the invention will be described in conjunction with figures. It shall be understood that the preferable embodiments described here are only used for describing and explaining, instead of limiting, the present invention.

Figure 1:
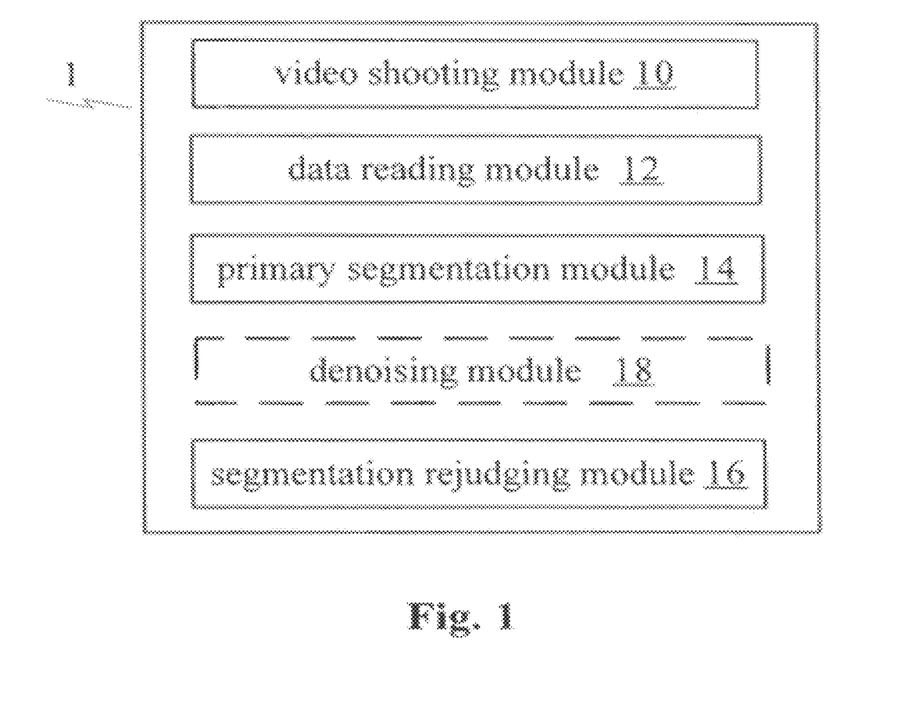
FIG. 1 is a block diagram illustrating a system 1 for segmenting foreground and background in a video according to the present invention.

FIG. 1 is a block diagram illustrating a system 1 for segmenting foreground and background in the video according to the present invention.

As shown in FIG. 1, the system 1 comprises: a video shooting module 10, for shooting the video; a data reading module 12, for reading each frame of the video; a primary segmentation module 14, for receiving each frame of the video from the data reading module, establishing a plurality of Gaussian models in a first color space for each pixel of each frame, and performing a matching processing between each pixel of a current frame and the plurality of Gaussian models corresponding to the pixel, and primarily segmenting the pixels as foreground and background according to the result of the matching processing, wherein a part of the plurality of Gaussian models being selected as background model and the rest as foreground model; and a segmentation rejudging module 16, for performing a rejudging processing in a second color space to the foreground and background that are processed by the primary segmentation module 14, so as to obtain a finally determined foreground and background.

Figure 2:
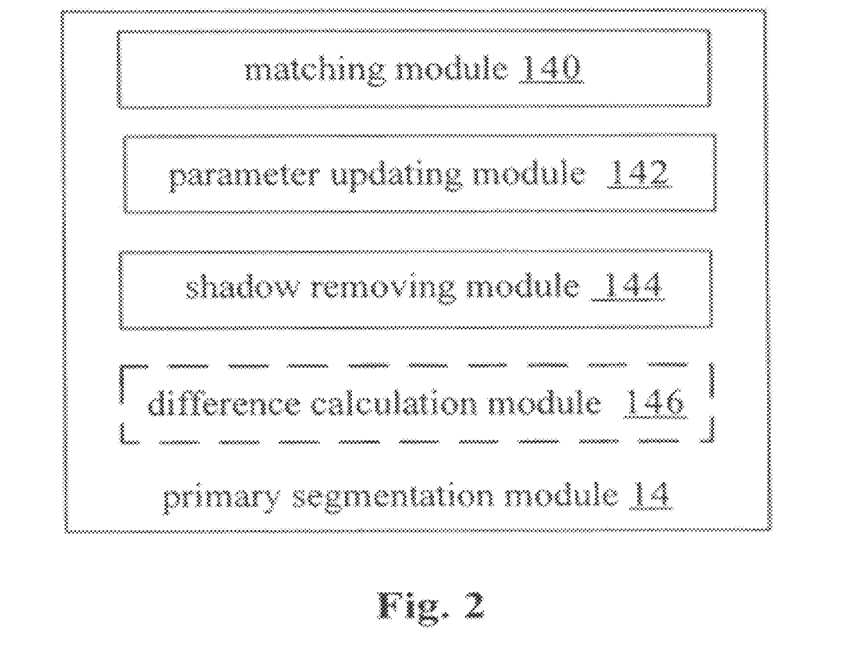
FIG. 2 is a block diagram illustrating the concrete structure of the primary segmentation module 14 shown in FIG. 1.

FIG. 2 is a block diagram illustrating the concrete structure of the primary segmentation module 14 shown in FIG. 1. As shown in FIG. 2, the primary segmentation module 14 further comprises: a matching module 140, for performing a matching processing between each pixel of the current frame and the plurality of Gaussian models corresponding to the pixel in a descending order of weight, and if a difference between a value of a current pixel in the first color space and a value of one Gaussian model in the first color space is smaller than a first threshold value, determining that the current pixel matches one Gaussian model, wherein pixels matching the background model being determined as background, and pixels matching the foreground model or having no matched models being determined as foreground; and a parameter updating module 142, for updating parameters of a model by using the color value of the current pixel, when it is determined in the matching module that the current pixel matches one Gaussian model, and for initializing newly a model having the smallest weight in the plurality of Gaussian models by using the color value of the current pixel, when it is determined in the matching module that no Gaussian model matches the current pixel.

Preferably, the primary segmentation module 14 further comprises: a shadow removing module 144, for performing a shadow removing processing to pixels that are segmented primarily as foreground, so as to correct the result of primary segmentation.

In the shadow removing module 144, when the absolute value of a hue difference between one pixel and a corresponding background model thereof is smaller than a second threshold value, the saturation difference is smaller than a third threshold value and the luminance difference is bigger than a fourth threshold value and smaller than a fifth threshold value, the pixel is determined as shadow, viz. the pixel is determined as background.

Figure 3:
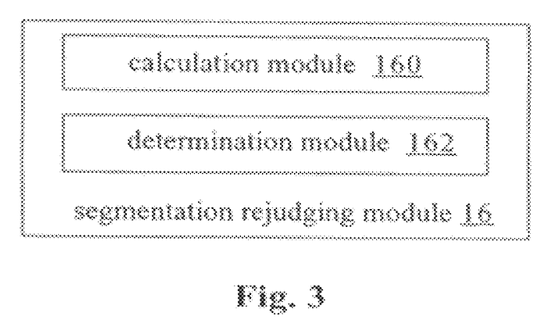
FIG. 3 is a block diagram illustrating the concrete structure of the segmentation rejudging module 16 shown in FIG. 1.

FIG. 3 is a block diagram illustrating the concrete structure of the segmentation rejudging module 16. As shown in FIG. 3, the segmentation rejudging module 16 comprises: a calculation module 160, for calculating a difference between a value of a specific pixels in the second color space and a value of a background model thereof in the second color space, the difference being represented by a weighted value of difference between the specific pixels as well as pixels in m neighborhoods around it and the corresponding background models thereof in the second color space, wherein m is an integer equal to or more than two; and a determination module 162, for determining the specific pixels as foreground when the weighted value is bigger than a sixth threshold value, otherwise as background.

Wherein, the specific pixels are pixels that are segmented as background primarily by the primary segmentation module and in neighborhoods around which there are pixels segmented primarily as foreground.

On the other hand, the specific pixels are pixels that are segmented as foreground primarily by the primary segmentation module and in neighborhoods around which there are pixels segmented primarily as background.

The value of the background model to which the specific pixels correspond in the second color space may be calculated by an average value of one or several background models of the specific pixels in the first color space. In this instance, the primary segmentation module 14 further comprises: a difference calculation module 146, in the case that it has been found a matched background model for a current pixel in the plurality of Gaussian models, for calculating a value of the matched background model in the second space according to an average value of the matched background model, and calculating a value of the current pixel in the second color space according to a value of the current pixel in the first color space, so as to obtain a difference between the value of the current pixel and the background model thereof in the second color space; and in the case that there is no matched background model for the current pixel in the plurality of Gaussian models, for calculating a value of the background model in the second space according to an average value of a background model having the highest weight, and calculating the value of the current pixel in the second color space according to the value of the current pixel in the first color space, so as to obtain a difference between the value of the current pixel and the background model thereof in the second color space, then providing the calculated difference to the segmentation rejudging module 16.

Alternatively, the value of the background models to which the specific pixels correspond in the second color space may be directly obtained by establishing Gaussian model for the specific pixels in the second color space.

In addition, the system further comprises: a denoising module 18, provided between the primary segmentation module 14 and the segmentation rejudging module 16 and for scanning pixels that are processed by the primary segmentation module 14 one by one and counting a number of pixels that are segmented primarily as foreground in n neighborhoods around each pixel, if the pixels being segmented primarily as foreground and the number being smaller than a seventh threshold value, the pixels being determined as background newly, while if the pixels being segmented primarily as background and the number being bigger than a eighth threshold value, the pixels being determined as foreground newly, wherein the eighth threshold value is bigger than the seventh threshold value, and n is an integer equal to or more than two.

Figure 4:
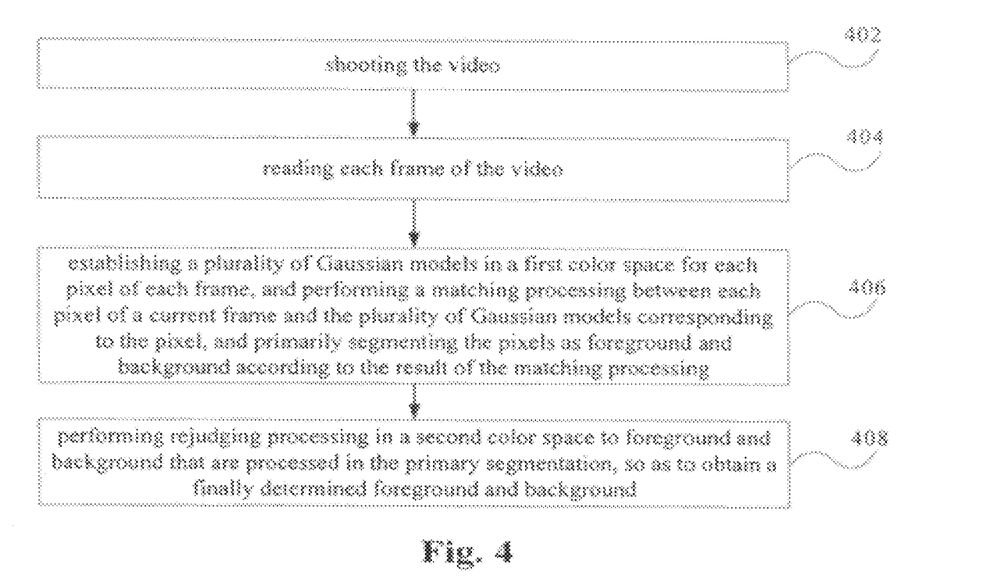
FIG. 4 is a flow chart illustrating a method for segmenting foreground and background in a video according to the present invention.

FIG. 4 is a flow chart illustrating a method for segmenting foreground and background in the video according to the present invention.

As shown in FIG. 4, the method comprises the following steps: a video shooting step 402 of shooting the video; a data reading step 404 of reading each frame of the video; a primary segmentation step 406 of receiving each frame of the video read in the data reading step, establishing a plurality of Gaussian models in a first color space for each pixel of each frame, and performing a matching processing between each pixel of a current frame and the plurality of Gaussian models corresponding to the pixel, and primarily segmenting the pixels as foreground and background according to the result of the matching processing, wherein a part of the plurality of Gaussian models being selected as background model and the rest as foreground model; and a segmentation rejudging step 408 of performing a rejudging processing in a second color space to the foreground and background that are processed in the primary segmentation step 406, so as to obtain a finally determined foreground and background.

Hereafter, the embodiments of the present invention are described in detail with reference to FIGS. 5-7.

Figure 5:
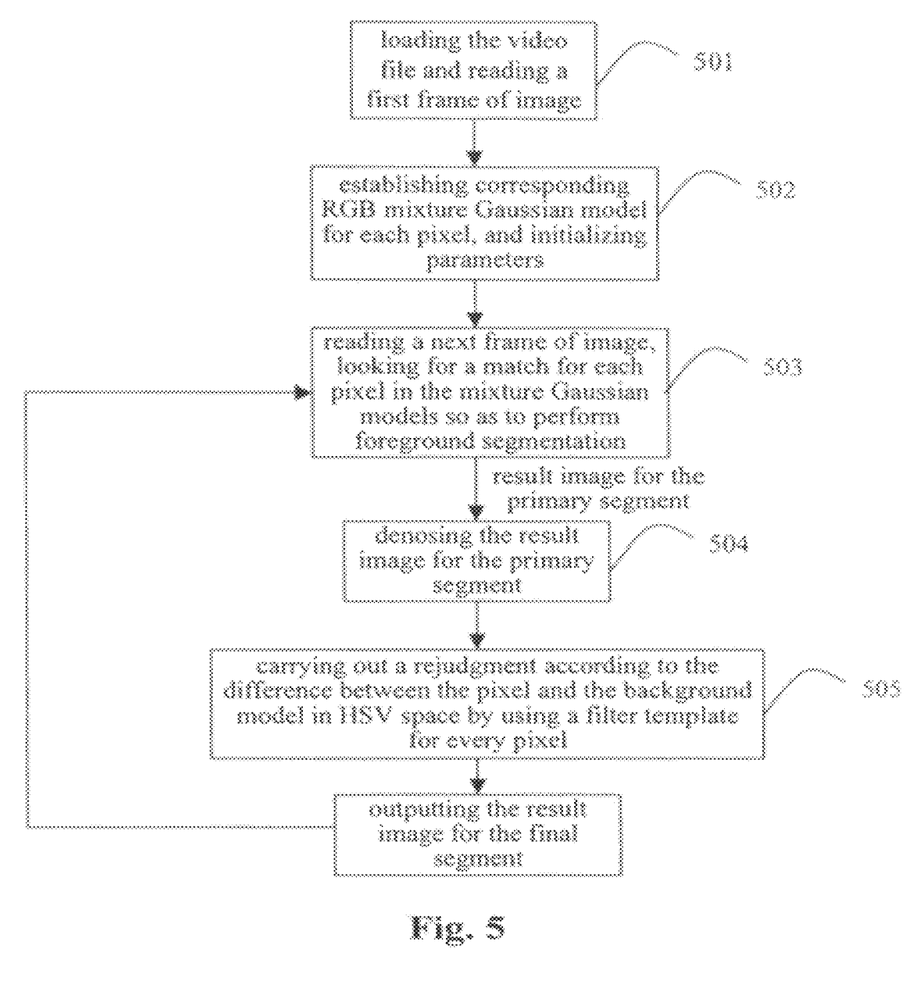
FIG. 5 is a schematic flow chart illustrating a method for segmenting foreground and background in a video according to the embodiments of the present invention.
Figure 6:
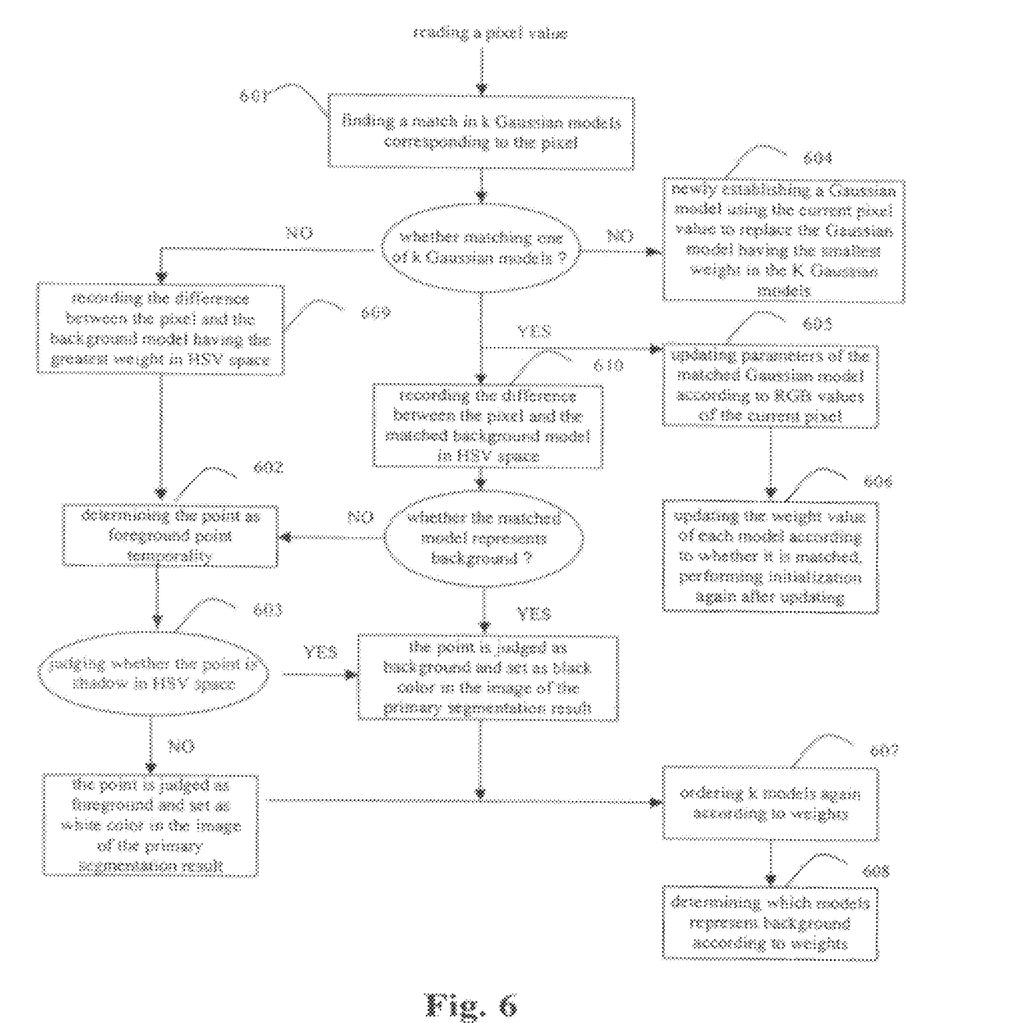
FIG. 6 is a concrete flow chart illustrating the step 503 in the flow chart shown in FIG. 5.
Figure 7:
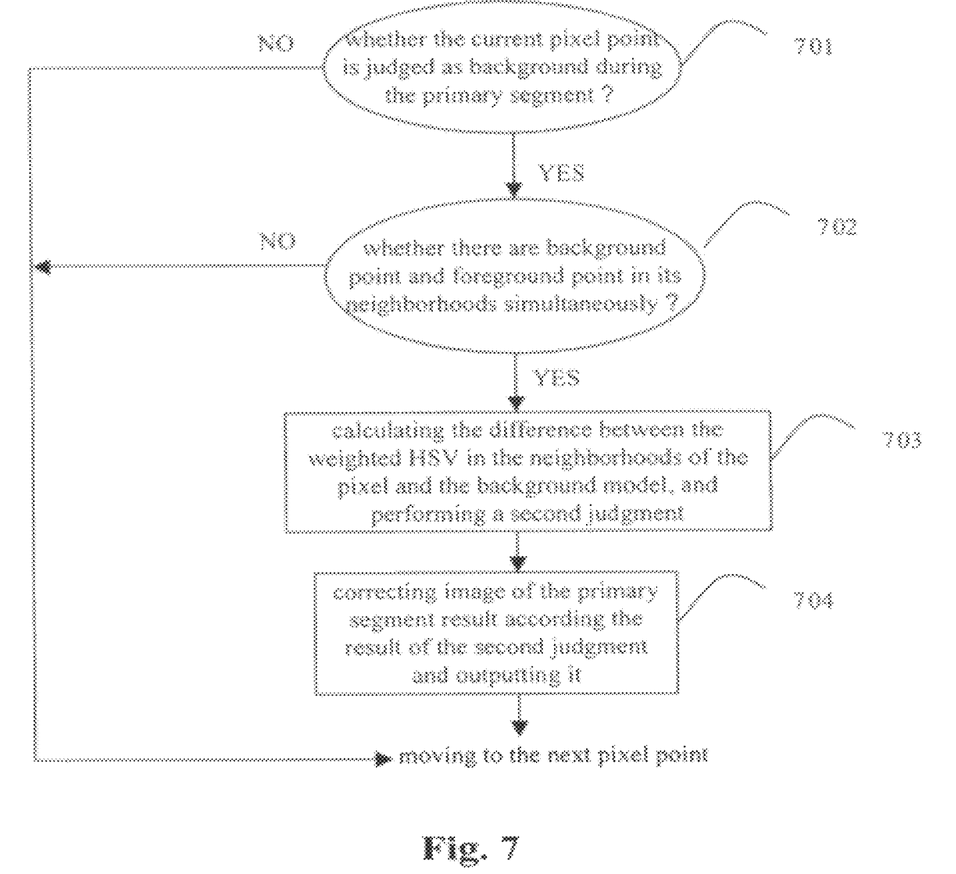
FIG. 7 is a concrete flow chart illustrating the step 505 in the flow chart shown in FIG. 5.

FIG. 5 is a schematic flow chart illustrating a method for segmenting foreground and background in the video according to the embodiments of the present invention, FIG. 6 is a concrete flow chart illustrating the step 503 in the flow chart shown in FIG. 5, and FIG. 7 is a concrete flow chart illustrating the step 505 in the flow chart shown in FIG. 5.

The whole flow chart of the method is shown in FIG. 5.

In step 501, a first frame of the video is read into the system.

Then, in the step 502, mixture Gaussian models are established according to the information of the video frame. Wherein, K Gaussian models are established for each pixel. If the video frame has a breadth frameW, and a height frameH, so frameW*frameH*K Gaussian models are established.

The mean value of K Gaussian models corresponding to each pixel is initialized by using RGB color value of said each pixel in the first frame of image. The weights of K Gaussian models for each pixel are initialized to 1/K, the mean value is the pixel value of the first frame, and the standard difference is automatically initialized by the system according to a predetermined value.

Subsequently, in the step 503, after the initialization of the mixture Gaussian models, a next frame of the video is read. A match for each pixel of the current read frame is looked for according to the weight from big to small in the plurality of Gaussian models corresponding to the pixel, and a primary segment is accomplished according to the matching result, and a result image for the primary segment is obtained. The principle for matching and the process thereof will be described in detail referring to FIG. 6.

Referring to FIG. 6, in the step 601, finding a match is so defined, that: regarding a Gaussian model, if a absolute difference between a mean value of R, G, B values of a current pixel and a mean value of R, G, B values of said Gaussian model is smaller than or equal to $\lambda$ (empirical value) times of standard difference, the current pixel matches the Gaussian model in color. Namely: $|V_i - \mu_i| \leq \lambda \cdot \sigma$, $i \in \{R, G, B\}$, wherein $\mu_i$ is the mean value of the Gaussian models, $V_i$ is R, G, B value of the current pixel.

The following steps 604, 605 and 606 are the varying process of the K background models during the pixel color matching process. It is described in detail as follows:

In the step 604, if the pixel does not find a matching model in the K Gaussian models corresponding to the pixel, a model having the smallest weight in the K Gaussian models is initialized again by using the RGB color value of the current pixel, wherein the RGB color value of the current pixel serves as the mean value, and a variance value predetermined by the system serves as the variance.

In the step 605, when the pixel matches one Gaussian model of the K Gaussian models corresponding to the pixel, parameters of the Gaussian model are updated by using the color value of the pixel. The method for updating is as follows:

Mean value: $\mu_{i,t} = (1-\rho)\mu_{i,t-1} + \rho V_{i,t}$, $i \in \{R, G, B\}$ Variance: $\sigma_{i,t}^2 = (1-\rho)\sigma_{i,t-1}^2 + \rho(V_{i,t} - \mu_{i,t})^T (V_{i,t} - \mu_{i,t})$, $i \in \{R, G, B\}$ Wherein, $\rho$ is an empirical value that is greater than 0 and less than 1.

Hereafter, in the step 606, the weight value of each background model is updated, and it is updated as follows according to whether it matches the current pixel value:

Weight: $\omega_{k,t} = (1-\alpha)\omega_{k,t-1} + \alpha \cdot M_{k,t}$, $k \in \{0, 1, \ldots K-1\}$ If the current pixel matches the model, then $M_{k,t} = 1$, if not, $M_{k,t} = 0$. $\alpha$ is predetermined by the system and is a leaning rate parameter representing the updating speed of the model. The updating way for the weight is based on the following thought: the longer a color appears at some pixel point, the greater the weight taken by the model of the color is, viz. the possibility that the model represents background is greater.

In addition, in the step 605, $\rho = \alpha \cdot \eta(V_t, \mu_k, \sigma_k)$, $\alpha$ is a predetermined leaning rate parameter, $\eta(V_t, \mu_k, \sigma_k)$ is probability density of the model:

$$\eta(X_t, \mu, \Sigma) = \frac{1}{(2\pi)^{\frac{n}{2}}|\Sigma|^{\frac{1}{2}}} e^{-\frac{1}{2}(X_t - \mu_t)^T \Sigma^{-1}(X_t - \mu_t)}$$

viz. the more the color value approaches the mean value, the more it influences the mean value and the variance of the matched model.

In the step 607, after the primary segment of the current pixel, as parameters of respective models change, the corresponding K Gaussian models should be ordered according to weight, so as to ensure that the order is from big to small when a next image comes for matching. The principle for order is determined as:

$$\frac{\omega}{\sigma},$$

viz. the probability of the color model with big weight and small variance for representing background is greater.

Then, in the step 608, it is determined which models in K Gaussian models represent background. As respective models have been already ordered in the step 606, the first n models that have a sum of the weights greater than a threshold T are selected as background.

In addition, in the step 609, if the pixel does not match a model in K Gaussian models corresponding to the pixel, then the HSV value representing background is calculated according to the mean value of the Gaussian model having the greatest weight, and the HSV value of the current pixel is calculated according to the RGB color value of the current pixel, so as to find and record the difference between the current pixel and the background model, and the current point is determined as foreground point temporality in the step 602.

Or in the step 610, if the pixel matches a model in K Gaussian models corresponding to the pixel, then the HSV value representing background is calculated according to the mean value of the Gaussian model matching the pixel, and the HSV value of the current pixel is calculated according to the RGB color value of the current pixel, so as to find and record the difference between the current pixel and the background model. Then it is judged whether the matched model represents background, if not, it is determined as foreground point temporality in the step 602, if yes, it is set as black color in the image of the primary segmentation result, and then the processing in the step 607 is performed.

In the step 603, it is judged whether the point segmented as foreground belongs to shadow projected by the foreground object onto background. The value of the point in HSV space is compared with the value of the background model color corresponding to the point in HSV space, if the current pixel point has similar hue and saturation to the background point, and the brightness thereof is lower than that of the background and within some threshold (TL, TH), said point is thus deemed as shadow and judged as background and set as black color in the image of the primary segmentation result, otherwise the point is judged as foreground and set as white color in the image of the primary segmentation result, and then the processing in the step 607 is performed.

Getting back to FIG. 5, in the step 504, each pixel of the image of the primary segmentation result is scanned one by one, and the segmentation result of the mixture Gaussian model is subjected to a denoising operation in 5×5 neighborhoods. The method is as follows:

The number sumW of white points (foreground) is counted in 5×5 neighborhoods of the current pixel, if the central point is a white point and sumW<WH, the central white point is deemed as noise point and set as black color; if the central point is a black point (background) and sumW>WH, it is deemed as a segmenting error that the central black point is segmented as background and the central black point is set as white color.

Although the number of white points is counted in 5×5 neighborhoods of the pixel in the step 504, it should be understood that the invention is not limited thereto, and the number of white points can be counted in 2×2 neighborhoods, 3×3 neighborhoods of the pixel etc.

In the step 505, a rejudgment for color similarity is carried out in HSV space according to the image of the primary segment result after denoising, so as to correct partial error of the judgment of RGB mixture Gaussian models.

The main error is: the RGB color value of some parts inside the foreground object is similar to that of background, so that some pixel regions inside the foreground object are segmented as background by mistake and thereby inner cavity appears. The step considers the relationship between one pixel and the neighbored pixels thereof in a weighted way and makes rejudgment in HSV space, so that the segmentation of foreground can be improved. The specific flow is shown in FIG. 7.

In the step 702, if the current pixel is segmented as background primarily, it is judged in the primary segmentation result whether there are black point (background) and white point (foreground) simultaneously in 3×3 neighborhoods of the pixel. That is, the second judgment for HSV is only performed at the boundary of black point and white point, because the second judgment for HSV space aims to cavity inside the foreground object, and the step is adopted to avoid repeat judgment for a broad real background region.

Although the number of white points is counted in 3×3 neighborhoods of the pixel in the step 702, it should be understood that the invention is not limited thereto, and the number of white points can be counted in 2×2 neighborhoods, 4×4 neighborhoods of the pixel etc.

In the step 703, the difference between the current pixel point and background model in HSV space as well as the difference between the pixel points in 4 neighborhoods of the current pixel and background model in HSV space are weighted and summed, the method is as follows specifically:

$$D_h = w_1 \cdot (D_{1h} + D_{2h} + D_{3h} + D_{4h}) + w_2 \cdot D_{0h}$$

$$D_s = w_1 \cdot (D_{1s} + D_{2s} + D_{3s} + D_{4s}) + w_2 \cdot D_{0s}$$

$$D_v = w_1 \cdot (D_{1v} + D_{2v} + D_{3v} + D_{4v}) + w_2 \cdot D_{0v}$$

Wherein, H, S, V are three components in HSV space, $D_0$ is the difference between the current pixel point and background model in HSV space, $D_1, D_2, D_3, D_4$ are the difference between the four pixels that are above, below, on the left and on the right of the current pixel respectively and background model in HSV space. $w_1$ is weight value of the surrounding four adjacent pixels, $w_2$ is weight value of the current pixel, and $w_1 \cdot 4 + w_2 = 1$. During the realization of the system, the values of $w_1$ and $w_2$ can be adjusted to control the influence of the surrounding pixels on the central pixel during the second judgment.

Although the difference between the pixel points in 4 neighborhoods of the current pixel respectively and background model in HSV space is calculated in the step 703, it should be understood that the invention is not limited thereto, and the difference between the pixel points in 2 neighborhoods, 3 neighborhoods etc. of the current pixel and background model in HSV space can be calculated.

After the weighted H, S, V difference has been obtained, a second judgment for the pixel is made according to the difference, if the color difference between the current pixel value and background model in HSV space is big enough, the pixel point that is judged as background during the primary segmentation is rejudged as foreground point. As HSV space can reflect the color feature of an object better and accords with the vision characteristics of people more, the cavity inside the foreground object can be improved effectively in initial segmentation result of RGB mixture Gaussian models through the operation in this step.

In addition, the processing shown in FIG. 7 is also suitable for pixel points that are segmented as foreground primarily and there are pixel points segmented as background in the neighborhoods of said pixel points, the noising points caused by the primary segmentation can be eliminated, the processing for which is similar to that shown in FIG. 7, so it is left out here.

Figure 8:
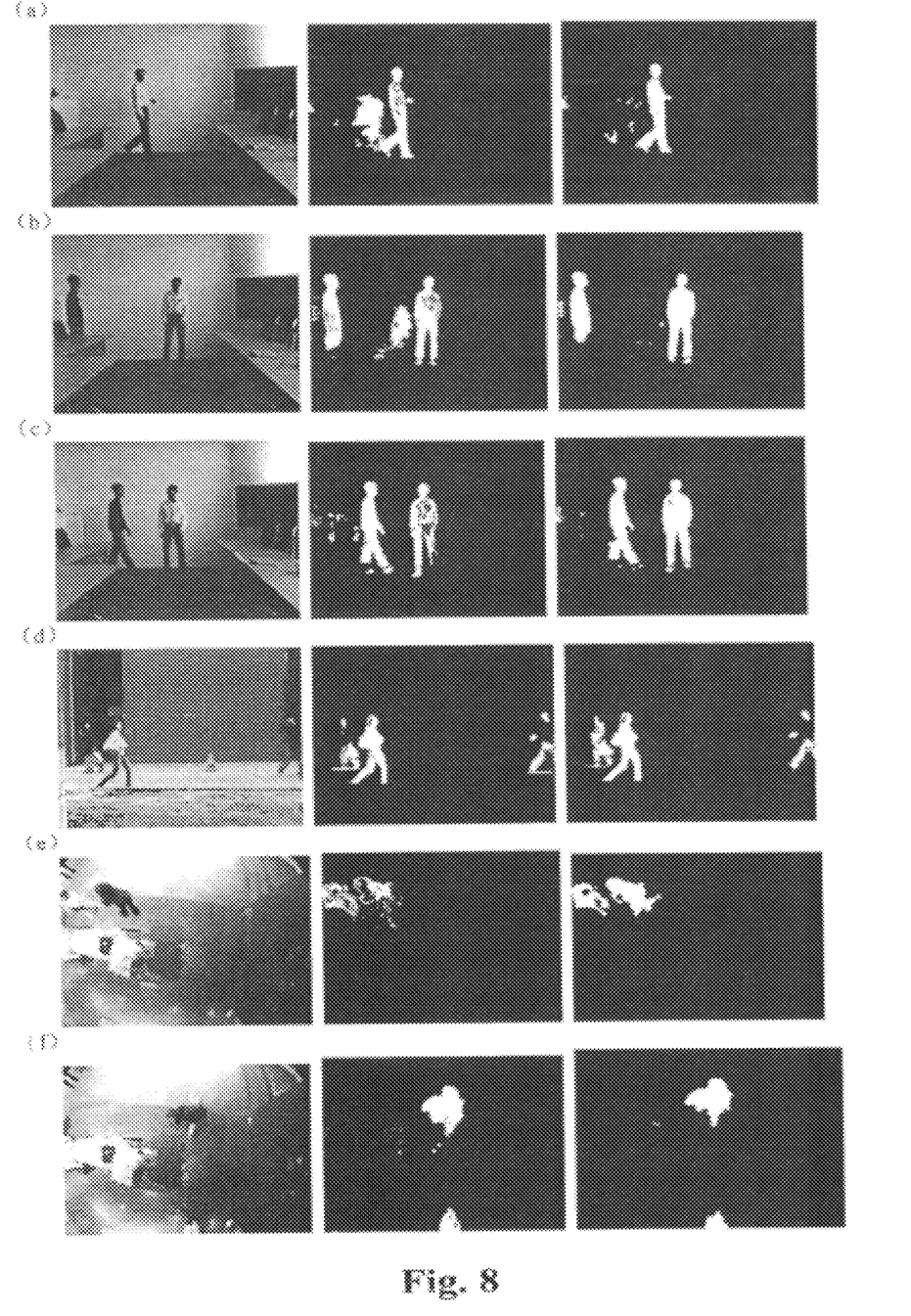
FIG. 8 shows the comparison between the segment effect according to the embodiments of the present invention and the segment effect of the method of the prior art.

FIG. 8 shows the comparison between the segment effect according to the embodiments of the present invention and the segment effect of the method of the prior art. It can be seen from FIG. 8 that the segmentation effect can be further improved by using the system and method of the present invention.

According to the present invention, after a segment has been performed in RGB space by using Gaussian models, a rejudgment is carried out according to the segment result as well as by using the difference between pixels in HSV space and background, the preciseness of segmentation of RGB space and the characteristic approaching the intuitional vision of personal eyes of HSV space are combined and the relationship among pixels is introduced, and a shadow removing module is used additionaly, so that a segment of moving object in a video shot by a fixed video camera is improved effectively.

It should be noted: although RGB space is taken as the first color space and HSV space is taken as the second color space in embodiments of the present invention, the color space can be varied as required during actual implementation, namely the first color space and the second color space may be RGB color, HSV color space or other color spaces, wherein the first color space is different from the second color space.

The above are only the preferable embodiments of the present invention and are not used to limit the present invention. The present invention may have various modifications and alternations for those skilled in the art. Any amendments, equivalent substitutions and improvements etc, in the spirits and principles of the present invention fall within the scope of protection of the present invention.

What is claimed is:

1. A system for segmenting foreground and background in a video, comprising:
   a video shooting module for shooting the video;
   a data reading module for reading each frame of the video;
   a primary segmentation module for receiving each frame of the video from the data reading module, establishing a plurality of Gaussian models in a first color space for each pixel of each frame, performing a matching processing between each pixel of a current frame and the plurality of Gaussian models corresponding to the pixel, and primarily segmenting the pixels as foreground and background according to the result of the matching processing, wherein a part of the plurality of Gaussian models being selected as background model and the rest as foreground model; and
   a segmentation rejudging module for performing a rejudging processing in a second color space to the foreground and background that are processed by the primary segmentation module, so as to obtain a finally determined foreground and background.

2. The system according to claim 1, wherein the primary segmentation module comprising:
- a matching module for performing a matching processing between each pixel of the current frame and the plurality of Gaussian models corresponding to the pixel in a descending order of weight, and if a difference between a value of a current pixel in the first color space and a value of one Gaussian model in the first color space is smaller than a first threshold value, determining that the current pixel matches the one Gaussian model, wherein pixels matching the background model being determined as background, and pixels matching the foreground model or having no matched models being determined as foreground; and
- a parameter updating module for updating parameters of a Gaussian model by using the color value of the current pixel, when it is determined in the matching module that the current pixel matches said Gaussian model, and for initializing newly a model having the smallest weight in the plurality of Gaussian models by using the color value of the current pixel, when it is determined in the matching module that no Gaussian model matches the current pixel.

3. The system according to claim 1, the primary segmentation module comprising:
- a shadow removing module for performing a shadow removing processing to pixels that are segmented primarily as foreground, so as to correct the result of primary segmentation.

4. The system according to claim 3, wherein in the shadow removing module, when the absolute value of the hue difference between one pixel and a corresponding background model thereof is smaller than a second threshold value, the saturation difference is smaller than a third threshold value and the luminance difference is bigger than a fourth threshold value and smaller than a fifth threshold value, the pixel is determined as shadow, viz. determined as background.

5. The system according to claim 1, the segmentation rejudging module comprising:
- a calculation module for calculating a difference between a value of a specific pixels in the second color space and a value of a background model thereof in the second color space, the difference being represented by a weighted value of difference between the specific pixels as well as pixels in m neighborhoods around it and the corresponding background models thereof in the second color space, wherein m is an integer equal to or more than two; and
- a determination module for determining the specific pixels as foreground when the weighted value is bigger than a sixth threshold value, otherwise as background.

6. The system according to claim 5, wherein the specific pixels are pixels that are segmented as background primarily by the primary segmentation module and in neighborhoods around which there are pixels segmented primarily as foreground.

7. The system according to claim 5, wherein the value of the background model to which the specific pixels correspond in the second color space are calculated by an average value of one or several background models of the specific pixels in the first color space.

8. The system according to claim 7, the primary segmentation module further comprising:
- a difference calculation module, in the case that it has been found a matched background model for a current pixel in the plurality of Gaussian models, for calculating a value of the matched background model in the second space according to an average value of the matched background model and calculating a value of the current pixel in the second color space according to a value of the current pixel in the first color space, so as to obtain a difference between the value of the current pixel and the background model thereof in the second color space; and in the case that there is no matched background model for the current pixel in the plurality of Gaussian models, for calculating a value of the background model in the second space according to an average value of a background model having the highest weight and calculating the value of the current pixel in the second color space according to the value of the current pixel in the first color space, so as to obtain a difference between the value of the current pixel and the background model thereof in the second color space, then providing the calculated difference to the segmentation rejudging module.

9. The system according to claim 5, wherein the value of the background models to which the specific pixels correspond in the second color space are directly obtained by establishing Gaussian model for the specific pixels in the second color space.

10. The system according to any of claims 1 to 9, further comprising:
- a denoising module provided between the primary segmentation module and the segmentation rejudging module, for scanning pixels that are processed by the primary segmentation module one by one and counting a number of pixels that are segmented primarily as foreground in n neighborhoods around each pixel, if the pixels being segmented primarily as foreground and the number being smaller than a seventh threshold value, the pixels being determined as background newly, while if the pixels being segmented primarily as background and the number being bigger than a eighth threshold value, the pixels being determined as foreground newly,
wherein the eighth threshold value is bigger than the seventh threshold value, and n is an integer equal to or more than two.

11. A method for segmenting foreground and background in a video comprising:
- a video shooting step of shooting the video;
- a data reading step of reading each frame of the video;
- a primary segmentation step of receiving each frame of the video read in the data reading step, establishing a plurality of Gaussian models in a first color space for each pixel of each frame, performing a matching processing between each pixel of a current frame and the plurality of Gaussian models corresponding to the pixel, and primarily segmenting the pixels as foreground and background according to the result of the matching processing, wherein a part of the plurality of Gaussian models being selected as background model and the rest as foreground model; and
- a segmentation rejudging step of performing a rejudging processing in a second color space to the foreground and background that are processed in the primary segmentation step, so as to obtain a finally determined foreground and background.

12. The method according to claim 11, wherein the primary segmentation step comprising:
- a matching step of perfomring a matching processing between each pixel of the current frame and the plurality of Gaussian models corresponding to the pixel in a descending order of weight, and if a difference between a value of a current pixel in the first color space and a value of one Gaussian model in the first color space is smaller than a first threshold value, determining that the current pixel matches the one Gaussian model, wherein pixels matching the background model being determined as background, and pixels matching the foreground model or having no matched models being determined as foreground; and a parameter updating step of updating parameters of a Gaussian model by using the color value of the current pixel, when it is determined in the matching step that the current pixel matches said Gaussian model, and for initializing newly a model having the smallest weight in the plurality of Gaussian models by using the color value of the current pixel, when it is determined in the matching step that no Gaussian model matches the current pixel.

13. The method according to claim 11, wherein the primary segmentation step comprising:

a shadow removing step of performing a shadow removing processing to pixels that are segmented primarily as foreground, so as to correct the result of primary segmentation.

14. The method according to claim 13, wherein in the shadow removing step, when the absolute value of the hue difference between one pixel and a corresponding background model thereof is smaller than a second threshold value, the saturation difference is smaller than a third threshold value and the luminance difference is bigger than a fourth threshold value and smaller than a fifth threshold value, the pixel is determined as shadow, viz. determined as background.

15. The method according to claim 11, wherein the segmentation rejudging step comprising:

a calculation step of calculating a difference between a value of a specific pixels in the second color space and a value of a background model thereof in the second color space, the difference being represented by a weighted value of difference between the specific pixels as well as pixels in m neighborhoods around it and the corresponding background models thereof in the second color space, wherein m is an integer equal to or more than two; and a determination step of determining the specific pixel as foreground when the weighted value is bigger than a sixth threshold value, otherwise as background.

16. The method according to claim 15, wherein the specific pixels are pixels that are segmented as background primarily by the primary segmentation step and in neighborhoods around which there are pixels segmented primarily as foreground.

17. The method according to claim 15, wherein the value of the background model to which the specific pixels correspond in the second color space are calculated by an average value of one or several background models of the specific pixel in the first color space.

18. The method according to claim 17, wherein the primary segmentation step further comprising:

a difference calculation step, in the case that it has been found a matched background model for a current pixel in the plurality of Gaussian models, calculating a value of the matched background model in the second space according to an average value of the matched background model and calculating a value of the current pixel in the second color space according to a value of the current pixel in the first color space, so as to obtain a difference between the value of the current pixel and the background model thereof in the second color space; and in the case that there is no matched background model for the current pixel in the plurality of Gaussian models, calculating a value of the background model in the second space according to an average value of a background model having the highest weight and calculating the value of the current pixel in the second color space according to the value of the current pixel in the first color space, so as to obtain a difference between the value of the current pixel and the background model thereof in the second color space, then providing the calculated difference to the segmentation rejudging step.

19. The method according to claim 15, wherein the value of the background models to which the specific pixels correspond in the second color space are directly obtained by establishing Gaussian model for the specific pixels in the second color space.

20. The method according to any of claims 11 to 19, the method further comprising:

a denoising step performed between the primary segmentation step and the segmentation rejudging step, scanning pixels that are processed by the primary segmentation step one by one and counting a number of pixels that are segmented primarily as foreground in n neighborhoods around each pixel, if the pixels are segmented primarily as foreground and the number is smaller than a seventh threshold value, the pixels are determined as background newly, while if the pixels are segmented primarily as background and the number is bigger than a eighth threshold value, the pixels are determined as foreground newly, wherein the eighth threshold value is bigger than the seventh threshold value, and n is an integer equal to or more than two.

* * * * *